US006661683B2

(12) United States Patent
Botker et al.

(10) Patent No.: US 6,661,683 B2
(45) Date of Patent: Dec. 9, 2003

(54) CHARGE PUMP HAVING VERY LOW VOLTAGE RIPPLE

(75) Inventors: Thomas L. Botker, Tucson, AZ (US); Haoran Zhang, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 54 days.

(21) Appl. No.: 10/101,050

(22) Filed: Mar. 18, 2002

(65) Prior Publication Data

US 2003/0174524 A1 Sep. 18, 2003

(51) Int. Cl.[7] .............................................. H02M 3/18
(52) U.S. Cl. ..................................... 363/60; 327/536
(58) Field of Search ..................... 363/60, 59; 327/536; 307/110

(56) References Cited

U.S. PATENT DOCUMENTS

| | | | |
|---|---|---|---|
| 5,717,581 A | | 2/1998 | Canclini |
| 5,973,944 A | | 10/1999 | Nork |
| 6,140,872 A | * | 10/2000 | McEldowney ................. 330/9 |
| 6,188,212 B1 | * | 2/2001 | Larson et al. ............... 323/281 |
| 6,201,375 B1 | * | 3/2001 | Larson et al. ............... 323/277 |
| 6,304,469 B1 | * | 10/2001 | Liu .............................. 363/60 |

OTHER PUBLICATIONS

Linear Technology, Step–Up/Step–Down Switched Capacitor DC/DC Converters with Reset, Technical Data Sheet, pp 1–8.
Linear Technolgy, "Doubler Charge Pumps with Low Noise Linear Regulator," Technical Data Sheet, pp 1–12.
Maxim Integrated Products, "Regulated 3.3V Charge Pump," Technical Data Sheet, Apr. 1997, pp 1–6.

Erich Bayer and Hans Schmeller, "Tomorrows Charge Pumps—Today," Apr.–Jun. 2000, European Technology, TI Technical Journal, Technical Paper, pp1–8.
Robert St. Pierre, Gain Technology Corporation, "Low-Power BiCMOS Op Amp with Integrated Current Mode Charge Pump," Technical Paper, pp 1–4.
Maxim Integrated Products, "Triple Charge–Pump TFT LCD DC–DC Converter," Oct. 2000, Technical Data Sheet, pp 1–13.
Texas Instruments, "50mA Switched–Cap DC/DC Converter," Feb. 2001, Technical Data, pp 1–8.
MAXIM, "Properties of the Charge–Pump Voltage Splitter," May 22, 2001, Technical Data, pp 1–6, http://dbserv.maxim-ic.com/tarticle/view.

* cited by examiner

Primary Examiner—Adolf D. Berhane
(74) Attorney, Agent, or Firm—W. Daniel Swayze, Jr.; W. James Brady; Frederick J. Telecky, Jr.

(57) ABSTRACT

A charge pump circuit is configured for continuous control of the output of the charge pump circuit through continuous use of at least one charge pump capacitor coupled with a servo amplifier. During and between both phases of operation of the charge pump circuit, the output current from the servo amplifier can be set equal to the load current through a continuous path. This servo amplifier configuration facilitates the continuous regulation of the load current, during both phases of operation, as well as in between the phases, and as a result no load current is drawn from the output capacitor, thus requiring no recharge of the output capacitor. In addition, an exemplary charge pump circuit can be configured with level-shifting capabilities, the ability to facilitate the use of lower voltage processes, and the ability to provide a large DC open loop gain and high stability. In addition, an exemplary charge pump circuit can be configured with capabilities for buck/boost operation.

32 Claims, 5 Drawing Sheets

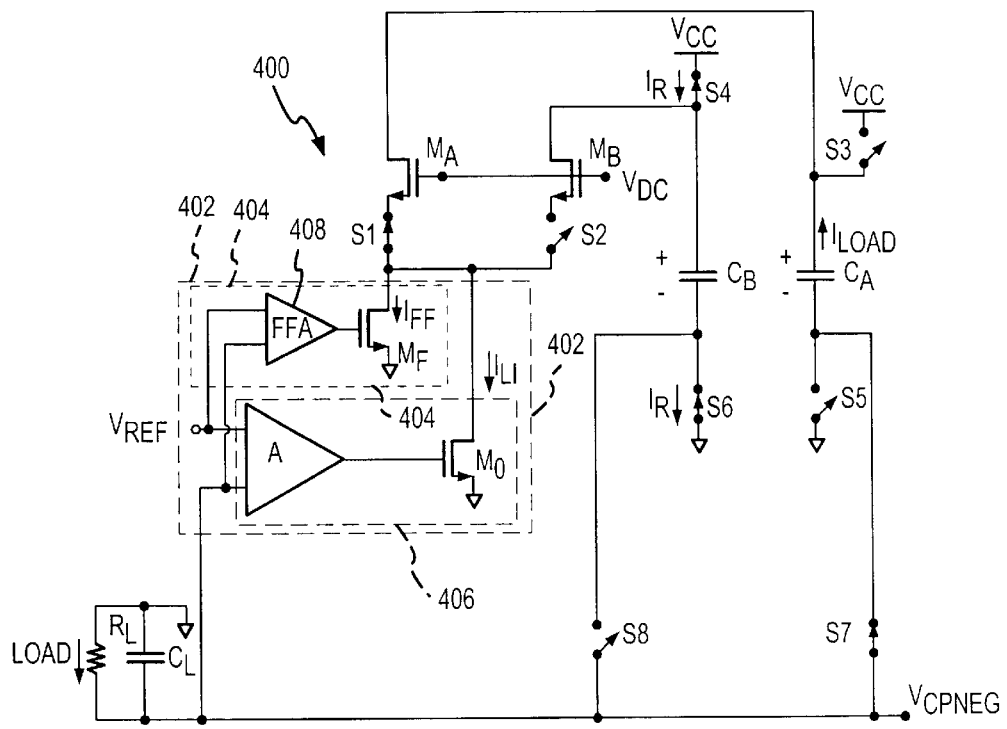
FIG.4
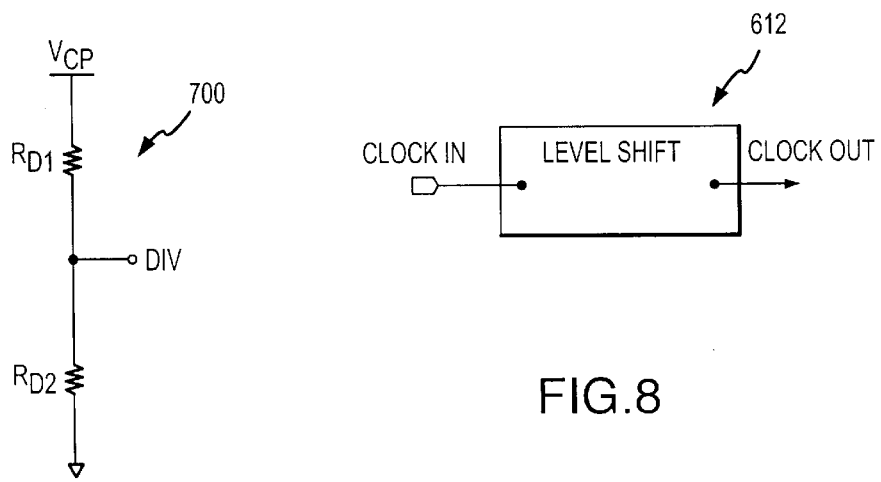
FIG.7
FIG.8

CHARGE PUMP HAVING VERY LOW VOLTAGE RIPPLE

FIELD OF INVENTION

The present invention relates to charge pump circuits. More particularly, the present invention relates to a charge pump circuit having very low output voltage ripple.

BACKGROUND OF THE INVENTION

The demand for less expensive, and yet more reliable integrated circuit components for use in communication, imaging and high-quality video applications continues to increase rapidly. As a result, integrated circuit manufacturers are requiring improved performance in the voltage supplies and references for such components and devices to meet the design requirements of such emerging applications.

One device utilized for providing a regulated voltage supply is a charge pump circuit. Charge pumps are DC/DC converters that utilize a capacitor instead of an inductor or transformer for energy storage, and are configured for generating positive or negative voltages from the input voltage. A common type of charge pump utilized in circuits comprises one configured for doubling the input voltage, i.e., a charge pump voltage doubler, while other frequently utilized charge pumps comprises tripler and inverter configurations. These charge pumps can operate to multiply the input voltage by some factor, such as by one-half, two, or three times or any other suitable non-integer or factor of the input voltage, to generate the desired output voltage.

Charge pumps typically utilize transistors and/or diodes as switching devices to provide current paths for charge transfer. For example, with reference to FIG. 1, a conventional positive charge pump 100 configured as a voltage doubler is illustrated. Charge pump doubler 100 comprises four switches $M_1$, $M_2$, $M_3$ and $M_4$, a pump capacitor $C_{PUMP}$, and an output or reservoir capacitor $C_{OUT}$. The charging and discharging current of capacitor $C_{PUMP}$ is determined by the output load requirements, e.g., by the output load current $I_{LOAD}$.

Charge pump doubler 100 is typically configured by a clock having a 50% duty cycle, i.e., a clock having a clock phase-A and phase-B. During clock phase-A, switches M1 and M2 are turned "on" to charge capacitor $C_{PUMP}$ to approximately the supply voltage $V_{IN}$, while switches M3 and M4 remain in an "off" condition. During clock phase-B, switches M3 and M4 are turned "on", while switches M1 and M2 are turned "off", to charge output capacitor $C_{OUT}$ to a higher voltage potential.

If the output voltage $V_{OUT}$ is not otherwise regulated, output voltage $V_{OUT}$ will reach a value of approximately twice the supply voltage $V_{IN}$ if load current $I_{LOAD}$ is small. Further, the frequency of the refresh cycle, i.e., the frequency of the charging of output capacitor $C_{OUT}$ by charge capacitor $C_{PUMP}$, can be suitably adjusted depending on the circuit load such that power efficiency can be maximized. However, this approach still produces a substantial amount of voltage ripple because output capacitor $C_{OUT}$ is only being refreshed 50% of the time, and thus the output load causes the output voltage $V_{OUT}$ to drop below its ideal unloaded voltage value. Further, this approach is highly susceptible to the ESR of output capacitor $C_{OUT}$. In other words, the ESR of output capacitor $C_{OUT}$ causes additional output ripple as a result of the recharging current that occurs during the output refreshing periods.

Another approach to limit the level of voltage ripple to a tolerable level can include configuring the reservoir or output capacitor with a larger capacitance value. However, such an arrangement is not desirable in that such a larger value capacitor results in a larger total printed circuit board area and higher manufacturing costs.

Yet another approach to reducing the voltage ripple at the output of a charge pump includes the implementation of two charge pump capacitors that alternately refresh an output capacitor. For example, with reference to FIG. 2, a charge pump circuit 200 that comprises two flying charge pump capacitors, $C_{F1}$ and $C_{F2}$, is illustrated. In this example, charge pump circuit 200 is configured with two control paths, with the charge pump output current split into two parts, $I_{CONT}$ and $I_{BASIC}$, and with current $I_{CONT}$ and $I_{BASIC}$ being made proportional to $I_{LOAD}$ using a linear regulator 202.

While this approach can improve the charge pump output ripple, charge pump circuit 200 still produces a significant amount of voltage ripple due to the existence of an amount of dead time when neither of charge pump capacitors $C_{F1}$ and $C_{F2}$ are refreshing output capacitor $C_{OUT}$, i.e., the switching between charge pump capacitors $C_{F1}$ and $C_{F2}$ results in a period of time when no refreshing of output capacitor $C_{OUT}$ occurs. In addition, mismatch between output current parts, $I_{CONT1}$ and $I_{CONT2}$, can cause additional error that results in additional output voltage ripple.

Yet another approach includes the implementation of a charge pump doubler, the output of which is followed by a low dropout regulator (LDO). For example, with reference to FIG. 3, a charge pump circuit 300 is configured to provide a boosted output provided by a charge pump doubler 302, and then convert the boosted output with a low dropout regulator 304 to a low noise regulated output. However, to produce a low voltage output ripple at output terminal $V_{OUT}$, low dropout regulator 304 has to reject the large ripple on the output of the charge pump doubler at large load currents, which is a difficult task. In addition, this approach is susceptible to any increases in output ripple because the input supply current to charge pump 300 can become quite noisy, and thus the high frequency line rejection characteristics of low dropout regulator 304 become of vital importance. As a result, to maintain low output ripple, the supply current that the low dropout regulator requires can increase as the load current increases so that the low dropout regulator can reject the larger voltage ripple from the charge pump doubler.

Furthermore, charge pump circuit 300 can produce voltages that are significantly higher than the maximum process voltage, i.e., charge pump circuit 300 can require a significantly higher voltage process since the input voltage $V_{IN}$ is doubled. For example, for a 4.4 volt input $V_{IN}$, charge pump circuit 300 needs to support 8.8 volts at the output capacitor C3, which is significantly higher than the desired output voltage of 5.0 volts at the output $V_{OUT}$. Thus, the voltage across some of the devices within the charge pumps may exceed the maximum allowable voltage for a given process. Accordingly, processes with higher breakdown voltages may be required for charge pump regulator 300 when implemented within integrated circuit applications, thus resulting in increased costs and circuit size compared to circuits implemented in low voltage processes.

Accordingly, a need exists for an improved charge pump circuit configured for providing a very low output ripple.

SUMMARY OF THE INVENTION

The method and circuit according to the present invention addresses many of the shortcomings of the prior art. In accordance with one aspect of the present invention, a charge pump circuit is configured to provide very low ripple as compared to that provided by the prior art charge pump circuits through continuous control of the output of the charge pump circuit. In accordance with an exemplary embodiment, a charge pump circuit is configured for continuous control of the output of the charge pump circuit through continuous use of at least one level-shifting device, such as a charge pump capacitor, coupled with a servo amplifier. During both phases of operation of the charge pump circuit, as well as during the switching phase, the output current from the servo amplifier can be set equal to the load current through a continuous feedback configuration. This servo amplifier configuration facilitates the continuous regulation of the load current, and as a result no load current is drawn from the output capacitor, thus requiring no recharge of the output capacitor.

In accordance with another aspect of the present invention, an exemplary charge pump circuit can be configured with level-shifting capabilities. In accordance with an exemplary embodiment, a first pump capacitor and a second pump capacitor facilitates the level shifting characteristics utilized by the servo amplifier output therefore allowing the output voltage of the charge pump circuit to be higher or lower than the input supply coupled to the charge pump circuit.

In accordance with various other aspects of the present invention, an exemplary charge pump circuit can be configured to facilitate the use of lower voltage processes, as well as providing a large DC open loop gain and good stability. In addition, an exemplary charge pump circuit can be configured with capabilities for buck/boost operation.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 4 illustrates a schematic diagram of an exemplary charge pump circuit in accordance with another exemplary embodiment of the present invention;

FIG. 7 illustrates a schematic diagram of an exemplary divider circuit in accordance with another exemplary embodiment of the present invention; and FIG. 8 illustrates a block diagram of an exemplary level shift block in accordance with an exemplary embodiment of the present invention.

DETAILED DESCRIPTION

Figure 1:
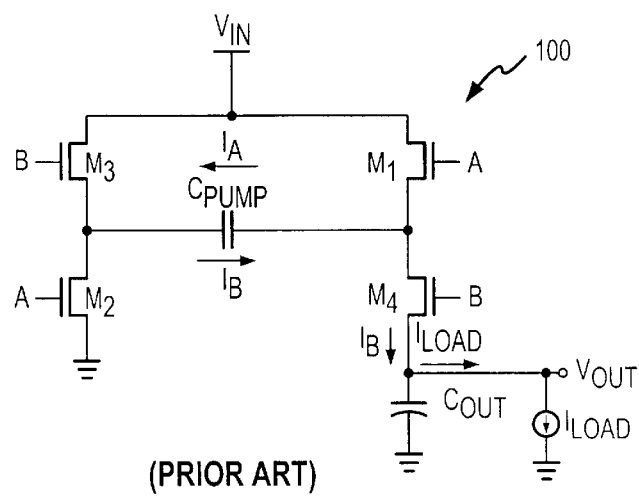
FIG. 1 illustrates a schematic diagram of a prior art charge pump doubler circuit.
Figure 2:
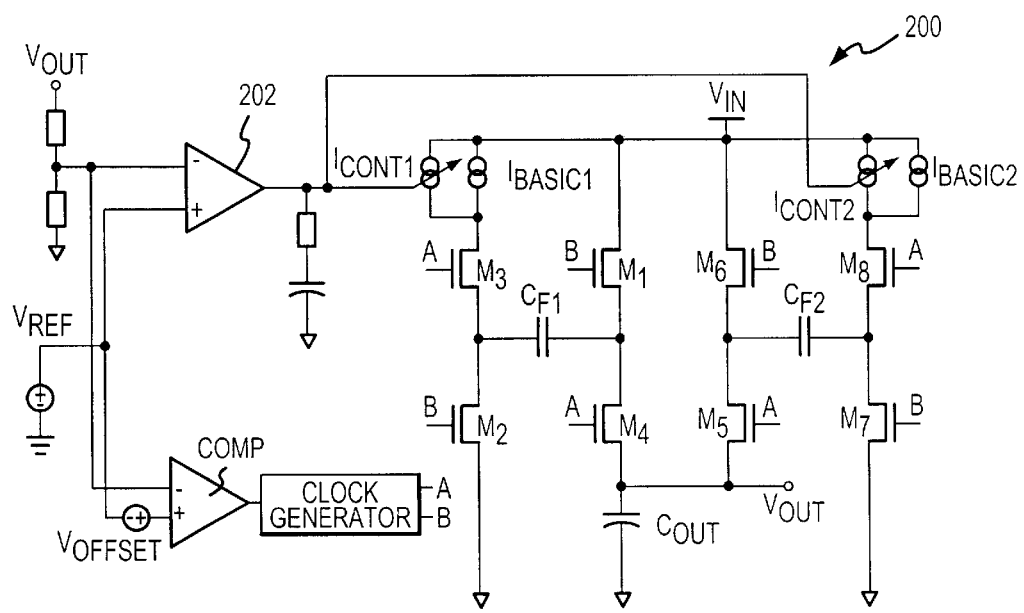
FIG. 2 illustrates a schematic diagram of a prior art dual charge pump capacitor circuit.
Figure 3:
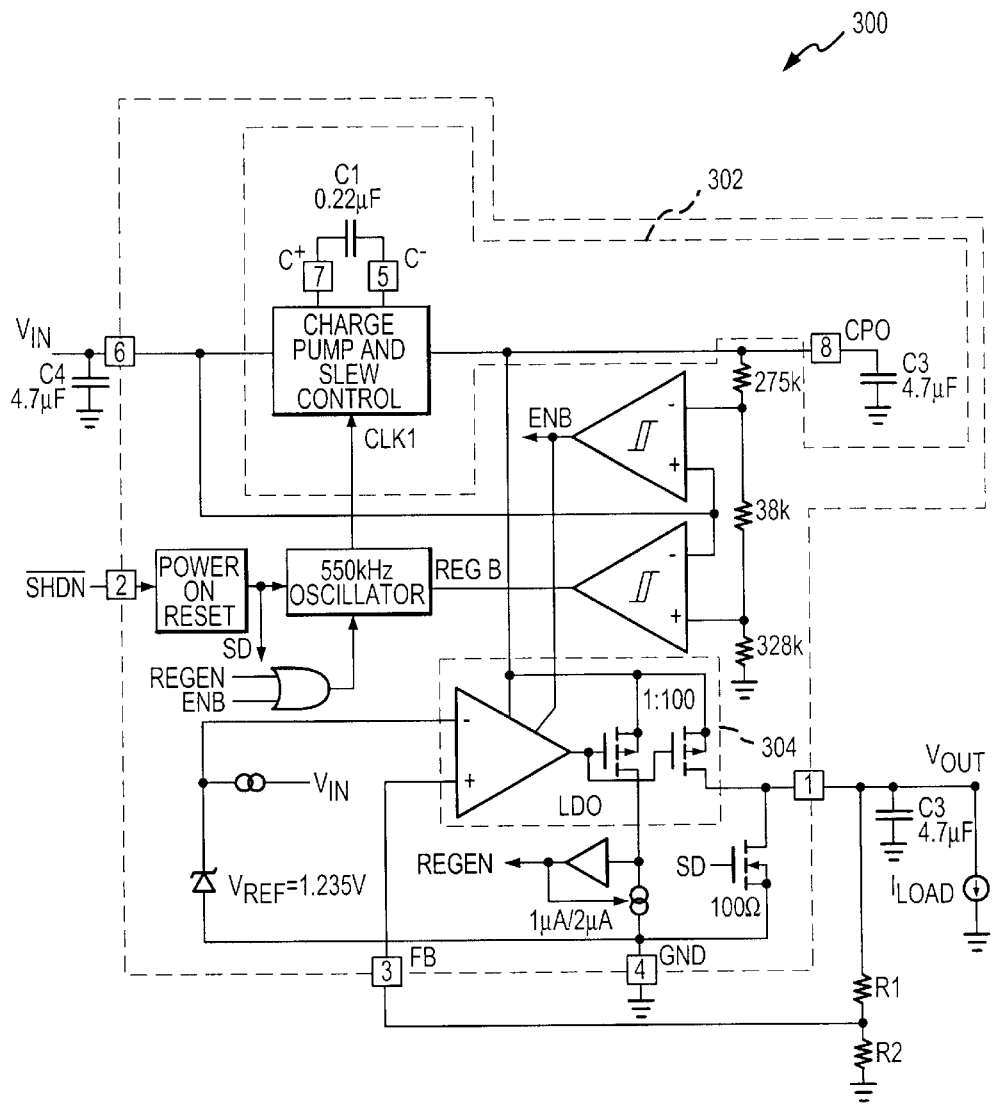
FIG. 3 illustrates a schematic diagram of a prior art charge pump doubler circuit followed by a low dropout regulator.

The present invention may be described herein in terms of various functional components and various processing steps. It should be appreciated that such functional components may be realized by any number of hardware or structural components configured to perform the specified functions. For example, the present invention may employ various integrated components, e.g., buffers, supply rail references, current mirrors, logic devices and the like, which are comprised of various electrical devices, e.g., resistors, transistors, capacitors, diodes and the like whose values may be suitably configured for various intended purposes. In addition, the present invention may be practiced in any integrated circuit application where regulated voltage supplies are desired. Such general applications that may be appreciated by those skilled in the art in light of the present disclosure are not described in detail herein. However for purposes of illustration only, exemplary embodiments of the present invention will be described herein in connection with a charge pump circuit. Further, it should be noted that while various components may be suitably coupled or connected to other components within exemplary circuits, such connections and couplings can be realized either by direct connection between components, or by connection through other components and devices located in between.

As discussed above, previous approaches for solving the problems of pump charge circuits have difficulty in limiting the output voltage ripple. In accordance with various aspects of the present invention, a charge pump circuit is configured to provide very low output ripple as compared to that provided by the prior art charge pump circuits. In accordance with an exemplary embodiment, a charge pump circuit is configured for continuous control of the output of the charge pump circuit through continuous use of at least one level-shifting device, such as a charge pump capacitor, coupled with a servo amplifier. During both phases of operation of the charge pump circuit, as well as during the switching phase, i.e., the period between both phases of operation, the output current from the servo amplifier can be set equal to the load current through a continuous feedback configuration. This servo amplifier configuration facilitates the continuous regulation of the load current, and as a result no load current is drawn from the output capacitor, thus requiring no recharge of the output capacitor.

For example, in accordance with an exemplary embodiment, with reference to FIG. 4, an exemplary charge pump circuit 400 is illustrated. Charge pump circuit 400 comprises a servo amplifier circuit 402, a pair of level-shifting devices comprising a first pump capacitor $C_A$ and a second pump capacitor $C_B$, and various switches S1–S8 that are suitably configured to continuously control the output current $I_{LOAD}$ through a load resistance $R_L$ or any other load, e.g., through a load current source. Servo amplifier circuit 402 can suitably comprise any amplifier circuit configured for facilitating the continuous control of an output current $I_{LOAD}$.

In the exemplary embodiment, servo amplifier circuit 402 comprises a DC amplifier 406 configured to provide a large DC open loop gain. DC amplifier 406 comprises at least one gain stage A and an output transistor $M_O$. DC amplifier 406 can also comprise various amplifier configurations, including, for example, one or more differential pairs of transistors with current mirror configurations, and/or one having multiple gain stages. DC amplifier 406 is configured with a transistor $M_O$ at the output of servo amplifier 402 to facilitate the providing of an output current $I_{L1}$. In addition, DC amplifier 406 has a first input of gain stage A coupled to an input voltage $V_{REF}$ and a second input of gain stage A coupled to the output load $R_L$ and an output capacitor $C_L$. Further, DC amplifier 406 can be coupled to a voltage divider circuit, for example, a voltage divider circuit 700 as illustrated in FIG. 7, including a pair of divider resistors, $R_{D1}$ and $R_{D2}$, coupled to a charge pump output voltage $V_{CP}$.

A large DC open loop gain in servo amplifier 402 can be beneficial to operation of charge pump circuit 400. In addition, the output of charge pump circuit 400 can be driven to a proportion K of the reference voltage $V_{REF}$, e.g., by gaining up the reference voltage $V_{REF}$ with a resistor divider. While it may be possible to simply design in a large DC open loop gain, such an approach can result in more detrimental stability problems However, in accordance with an exemplary embodiment, servo amplifier circuit can also include a feed-forward circuit 404 configured to provide good loop stability, as well as provide good capacitive load drive capabilities, such that charge pump circuit 400 also has a large stable DC open loop gain. Feed forward circuit 404 suitably comprises a feed-forward amplifier (FFA) circuit configured in parallel with the DC gain stage, i.e., in parallel with DC amplifier circuit 406. The feed-forward amplifier FFA path can comprise a wide bandwidth high-speed amplifier 408 and an output transistor $M_F$ that is configured to couple in the tail current $I_{FF}$ of a feed-forward path FFA to provide good loop stability. However, the feed-forward amplifier can be configured in various other manners to provide for loop stability. For example, in accordance with another exemplary embodiment, servo amplifier 402 can be configured with feed-forward circuit 404, but without DC amplifier 406.

First pump capacitor $C_A$ and second pump capacitor $C_B$ behave as level-shifting devices suitably configured to provide a continuous path to facilitate the continuous control of the output current of servo amplifier 402. In the exemplary embodiment, first capacitor $C_A$ and second capacitor $C_B$ are configured to be coupled to the output of servo amplifier 402 during each phase of operation, to the input of servo amplifier 402 to provide a feedback arrangement during each phase of operation, as well as in between the two phases in an overlapping scheme described below. For example, first capacitor $C_A$ is suitably coupled to the output of servo amplifier 402, e.g., to the drain of transistor $M_O$ and $M_F$, through switch S1 and a cascode transistor $M_A$, while second capacitor $C_B$ is suitably coupled to the output of servo amplifier 402, e.g., to the drain of transistor $M_O$ and $M_F$, through switch S2 and a cascode transistor $M_B$. In addition, the top plates of first capacitor $C_A$ and second capacitor $C_B$ are suitably coupled to the supply voltage $V_{CC}$ through switches S3 and S4, respectfully. Further, the bottom plates of first capacitor $C_A$ and second capacitor $C_B$ are suitably coupled to ground through switches S5 and S6, respectfully, and to the output voltage, $V_{CPNEG}$, through switches S7 and S8, respectfully. While two pump capacitors $C_A$ and $C_B$ are illustrated, fewer or additional level-shifting devices could also be included within various exemplary embodiments of the present invention.

Switches S1–S8 can comprises various conventional switching mechanisms. For example, switches S1–S8 can comprise transistor devices, such as MOSFET or JFET devices. Such switches S1–S8 can be configured in any arrangement now known or hereinafter devised for providing switching functions.

During a phase A, with first capacitor $C_A$ suitably charged to supply voltage $V_{CC}$, switches S1, S4, S6 and S7 are closed, and switches S2, S3, S5 and S8 are opened. This switch configuration permits output current $I_{LOAD}=I_{L1}+I_{FF}$ to flow through transistors $M_O$ and $M_F$, switch S1, first capacitor $C_A$ and switch S7 back to the second input of servo amplifier 402, such that first capacitor $C_A$ supplies output current $I_{LOAD}$. Meanwhile, second capacitor $C_B$ is suitably recharged to supply voltage $V_{CC}$. In accordance with another exemplary embodiment, second capacitor $C_B$ could also be recharged via current sources.

Next, during a phase B, with first capacitor $C_B$ suitably recharged to supply voltage $V_{CC}$, switches S2, S3, S5 and S8 are closed, and switches S1, S4, S6 and S7 are opened. This configuration permits output current $I_{LOAD}=I_{L1}+I_{FF}$ to flow through transistors $M_O$ and $M_F$, switch S2, second capacitor $C_B$ and switch S8 back to the second input of servo amplifier 402, such that second capacitor $C_B$ supplies output current $I_{LOAD}$. Meanwhile, first capacitor $C_A$ is suitably recharged to supply voltage $V_{CC}$. As a result, servo amplifier 402 is configured to continuously provide a single output current during both phases, and between both phases, through at least one capacitive, level shifting device, e.g., first capacitor $C_A$ and/or second capacitor $C_B$, to continuously control the output current from charge pump circuit 400.

While the above exemplary embodiment includes the switching from a phase A to a phase B to provide output current $I_{LOAD}$ from first capacitor $C_A$ and second capacitor $C_B$, in accordance with another exemplary embodiment of the present invention, the switching sequence can be suitably configured with an overlapping scheme. This overlapping scheme is configured such that output current $I_{LOAD}$ is continuously controlled, thus eliminating any time periods that can permit output current $I_{LOAD}$ to discharge output capacitor $C_L$ causing the output voltage to drop below the desired output level, i.e., the overlapping schemes facilitates the removing of the voltage ripple components resulting from recharging of output capacitor $C_L$.

In accordance with an exemplary embodiment, the overlapping scheme can be facilitated through use of an overlapping clock scheme in which switches S1 and S7 and switches S2 and S8 are closed at the same time during the switching between phases such that both first capacitor $C_A$ and second capacitor $C_B$ are suitably supplying output current $I_{LOAD}$. The overlapping clock scheme can be provided through various types of clock signals, with various amounts of overlapping, for facilitating first capacitor $C_A$ and second capacitor $C_B$ simultaneously supplying output current $I_{LOAD}$ during switching between phases.

Transistors $M_A$ and $M_B$, are suitably configured with a high output resistance $r_D$ at their respective drains. As a result, during a period when switches S1 and S2 are closed at the same time, such as through an overlapping clock scheme, the upper terminals of first capacitor $C_A$ and second capacitor $C_B$ are not "shorted" together due to the high output resistance $r_o$ at the drains of transistors $M_A$ and $M_B$. Furthermore, transistors $M_A$ and $M_B$ permit the lower terminals of first capacitor $C_A$ and second capacitor $C_B$ to be simultaneously coupled to the load resistance, i.e., switches S7 and S8 can be closed at the same time without having some of the charge of first capacitor $C_A$ or second capacitor $C_B$ being fed through to the other pump capacitor.

As a result, when switching between phases, transistors $M_A$ and $M_B$ can operate as a divider circuit to divide output current $I_L$. Thus, for example, in the case where transistors $M_A$ and $M_B$ are perfectly matched in size and characteristics, e.g., ignoring the potential differences in output resistance $r_o$, output current $I_L$ can be divided such that approximately ½ $I_L$ flows through each of transistors $M_A$ and $M_B$. Moreover, during the switching between phases, various other fractions of current can be provided through each of transistors $M_A$ and $M_B$ such that the total flow of current equals output current $I_L$.

Charge pump circuit 400 can also be configured without transistors $M_A$ and $M_B$, for example, with transistors $M_A$ and $M_B$ replaced with shorts. However, use of transistors $M_A$ and $M_B$ provides for better performance as described above. In addition, it should be noted that charge pump circuit 400 can be configured through any capacitor configuration that allows for continuous control of the load current $I_L$.

Accordingly, during operation of charge pump circuit 400, output capacitor $C_L$ can suitably charged during startup, but does not need to be recharged by servo amplifier 402, i.e., since output load $R_L$ is not required to pull any charge off of output capacitor $C_L$, no recharge of output capacitor $C_L$ is needed. This result occurs since transistors $M_O$ and $M_F$ are configured with servo amplifier 402 to provide a current equal load current $I_{LOAD}$, and which can always be supplied by charge capacitors $C_A$ and $C_B$, or a combination of the two capacitors. Further, the ESR and voltage ripple associated with the prior art circuits can be significantly reduced and/or eliminated.

In accordance with another aspect of the present invention, exemplary charge pump circuit 400 can be configured with level-shifting capabilities. In accordance with an exemplary embodiment, first capacitor $C_A$ and second capacitor $C_B$ facilitates the level shifting characteristics that allows the output of charge pump circuit 400 to be lower than an internally generated voltage reference within charge pump circuit 400. For example, to properly operate DC amplifier 406 and feed-forward circuit 404 to provide a controlled output current $I_{LOAD}$, sufficient headroom on transistors $M_O$ and $M_F$ is needed. Through use of the feedback configuration of first capacitor $C_A$ and second capacitor $C_B$, the level shifting capabilities of these capacitors prevent transistors $M_O$ and $M_F$ from operating in a trioded manner. Accordingly, the output load current $I_{LOAD}$ can be continuously controlled, which can result in very low levels of output ripple.

Figure 5:
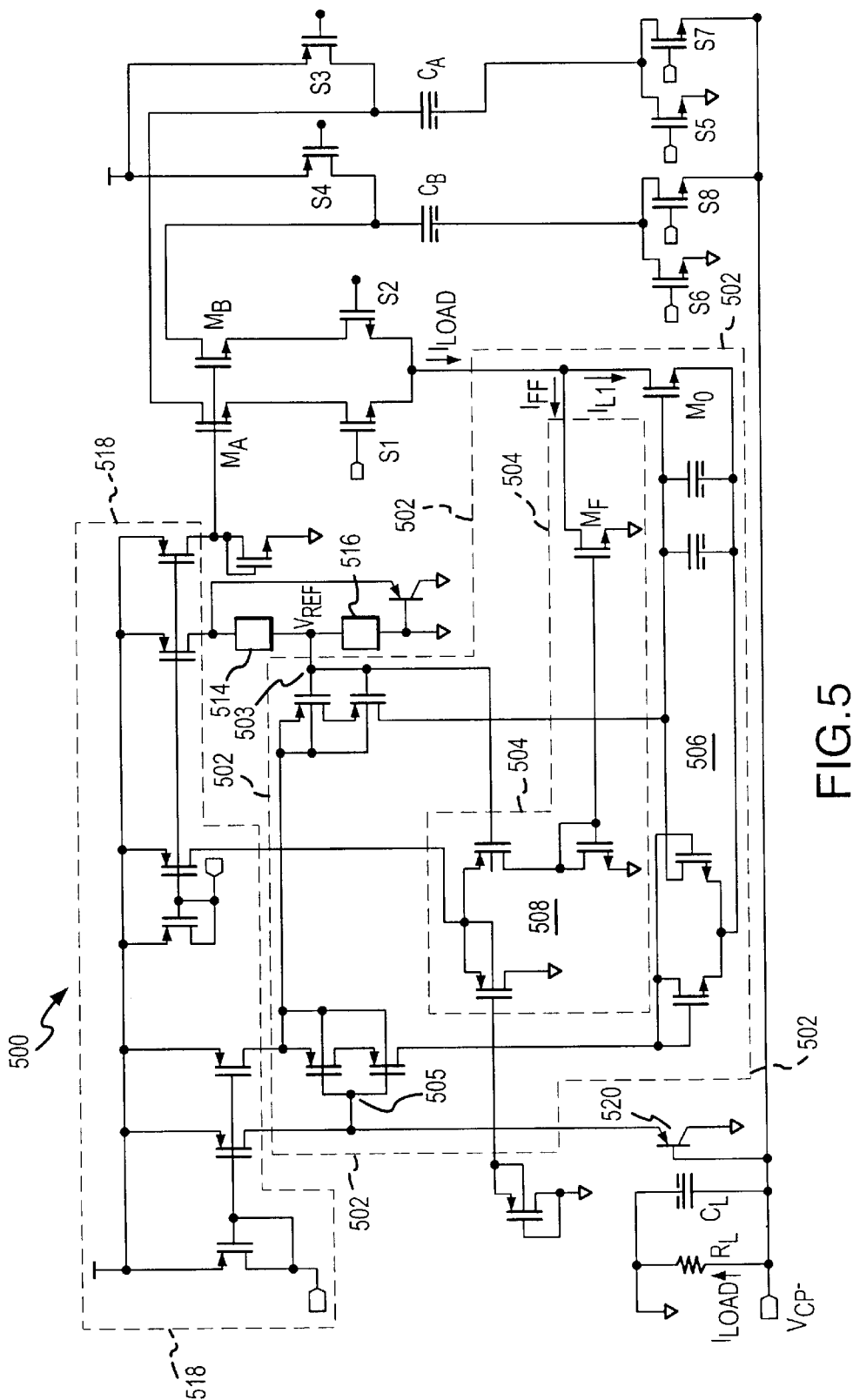
FIG. 5 illustrates a schematic diagram of an exemplary negative charge pump circuit in accordance with another exemplary embodiment of the present invention.

It should be noted that charge pump circuit 400 can comprise various exemplary embodiments, including embodiments comprising a negative charge pump circuit and/or a positive charge pump circuit. For example, with reference to FIG. 5, an exemplary negative charge pump circuit 500 is illustrated. Negative charge pump circuit 500 suitably comprises a servo amplifier circuit 502, first pump capacitor $C_A$ and second pump capacitor $C_B$, and various switches S1–S8 that are suitably configured to continuously control the output current $I_L$ through a load resistance $R_L$.

While servo amplifier circuit 502 can suitably comprise any amplifier circuit configured for facilitating the continuous control of an output current $I_L$, in this exemplary embodiment, servo amplifier circuit 502 comprises a DC amplifier 506 and a feed-forward circuit 504. DC amplifier 506 is configured with a transistor $M_O$ at the output of servo amplifier 502 to provide an output current $I_{L1}$. In addition, DC amplifier 506 has a first input 503 coupled to an input voltage $V_{REF}$ and a second input 505 coupled to the output load $R_L$ through a PNP transistor 520. First input 503 may be suitably configured with a voltage divider configuration, such as voltage divider blocks 514 and 516, which can be configured with output voltage $V_{REF}$ as a reference circuit.

Feed-forward circuit 504 is configured such that charge pump circuit 500 has good loop stability, as well as large capacitive load drive capabilities. In accordance with this exemplary embodiment, feed forward circuit 504 can comprise a wideband amplifier 508 and a transistor $M_F$ that provides a feed-forward path to provide good loop stability, wherein load current $I_{LOAD}=I_{L1}+I_{FF}$. However, feed-forward circuit 504 can also comprise various other arrangements for providing sufficient loop stability.

Output load $R_L$ can be configured in various arrangements. For example, output load $R_L$ can be representative of any output load on charge pump circuit 500. In addition, an output capacitor $C_L$ configured for stability is provided in a parallel configuration with output load $R_L$.

Meanwhile, switches S1–S8 suitably comprise FET-based transistor devices configured for switching of the charging and discharging functions between the feedback loops for capacitors $C_A$ and $C_B$. For example, switches S1–S8 can comprise MOSFET or JFET-based devices, or any other switching device.

Various other components can also be included within various exemplary embodiments of a negative charge pump circuit 500. For example, negative charge pump circuit 500 can also include external bias circuitry 518, or any other external bias current sources for facilitating operation of charge pump circuit 500. Moreover, power-down circuitry may also be included with various exemplary embodiments. Further, various current mirror devices may be configured within charge pump circuit 500.

Figure 6:
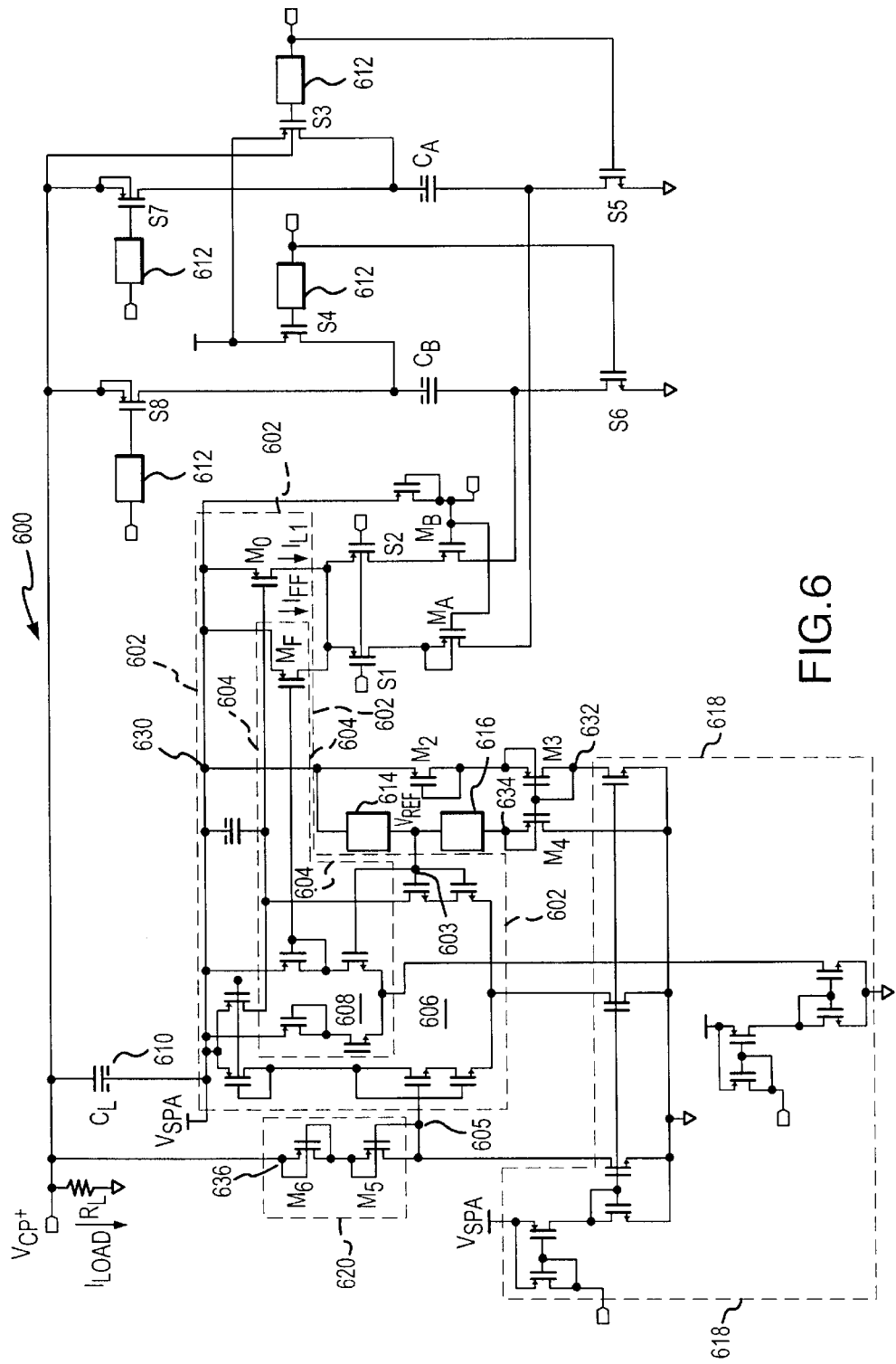
FIG. 6 illustrates a schematic diagram of an exemplary positive charge pump circuit in accordance with another exemplary embodiment of the present invention.

With reference to FIG. 6, an exemplary positive charge pump circuit 600 is illustrated. Positive charge pump suitably comprises a servo amplifier circuit 602, first pump capacitor $C_A$ and second pump capacitor $C_B$, and various switches S1–S8 that are suitably configured to continuously control the output current $I_{LOAD}$ through a load resistance $R_L$, or any other load device, such as current sources.

Like servo amplifier 502 illustrated above, servo amplifier circuit 602 can suitably comprise any amplifier circuit configured for facilitating the continuous control of an output current $I_L$. In this exemplary embodiment, servo amplifier circuit 602 comprises a DC amplifier 606 and a feed-forward circuit 604. DC amplifier 606 is configured with a transistor $M_O$ at the output of servo amplifier 602 to provide an output current $I_{L1}$.

In addition, DC amplifier 606 has a first input 603 coupled to an input voltage $V_{REF}$ and a second input 605 coupled to the output load $R_L$ through a pair of diode-connected transistors $M_5$ and $M_6$. First input 603 may be suitably configured with a voltage divider configuration, such as voltage divider blocks 614 and 616 configured, for example, as a reference circuit with reference voltage $V_{REF}$. Further, while second input 605 is coupled to a level shifting configuration 620 comprising diode-connected transistors $M_5$ and $M_6$, second input 605 can also be suitably coupled to a voltage dividing configuration, such as a voltage divider circuit 700. In other words, second input 605 can also coupled to any voltage dividing configuration configured to divide the charge pump output voltage $V_{CP}$ to provide the feedback voltage $V_{FB}$.

Feed-forward circuit 604 is configured such that charge pump circuit 600 has good loop stability, as well as providing large capacitive load drive capabilities. In accordance with this exemplary embodiment, feed forward circuit 604 can comprise a wideband amplifier 608 and a transistor $M_F$ that provides a current $I_{FF}$ in a feed-forward path to provide good loop stability. However, like that of circuit 500, feed-forward circuit 604 can also comprise various other feed-forward arrangements for providing loop stability.

Meanwhile, switches S1–S8 suitably comprise FET-based transistor devices configured for switching of the charging and discharging between the feedback loops for capacitors $C_A$ and $C_B$. Switches S1–S8 can comprise MOSFET or JFET-based devices, or any other switching device. In addition, while switches S1–S8 can be driven in various manners, in accordance with an exemplary embodiment, various level shift blocks 612 are suitably included with switches S3, S4, S7 and S8 to minimize the effects of output voltage ripple due to switching which would occur if the supply for the drivers of switches S3, S4, S7 and S8 were coupled to the output capacitor $C_L$. Level shift blocks 612 can comprise various configurations. For example, with momentary reference to FIG. 8, level shift blocks 612 can comprise a level shift block having a clock input and clock output terminal. In addition, level shift blocks can comprise simple charge pumps. Further, level shift blocks 612 can comprise any configuration for providing a voltage for driving switches S3, S4, S7 and S8, such as individual charge pump devices.

Various other components can also be included within various exemplary embodiments of a positive charge pump circuit 600. For example, positive charge pump circuit 600 can also include external bias circuitry 618. Moreover, power-down circuitry may also be included with various exemplary embodiments.

In accordance with another aspect of the present invention, an exemplary charge pump circuit can be configured with capabilities for buck/boost operation. In accordance with this aspect of the present invention, charge pump circuit 600 can be suitably configured to provide for an output voltage larger than the supply voltage $V_{SPA}$, and an output voltage lower than the power supply voltage $V_{SPA}$, i.e., positive charge pump circuit 600 can be suitably configured for buck/boost operation.

In an example of boost operation, with a charge pump voltage $V_{CP}+$ of 6.5 volts, the power supply voltage at node 630, i.e., at $V_{SPA}$, would be 5 volts. Assuming a drop of one volt per $V_{GS}$ of transistors $M_2$ and $M_3$ provides a voltage of 3 volts at node 632. Again, assuming a drop of one volt per $V_{GS}$ of transistor $M_4$ provides a voltage of 4 volts at node 634. Through resistor divider blocks 614 and 616, a reference voltage of 4.5 volts for $V_{REF}$ could be realized. As a result of the operation of servo amplifier 602, which provides that the difference in voltage for first input 603 and second input 605 is zero volts, the voltage at the second input terminal will also be 4.5 volts. Again, assuming a drop of one volt per $V_{GS}$ of transistors $M_5$ and $M_6$ provides a voltage of 6.5 volts at node 636, i.e., at $V_{CP}+$. As a result of this boost operation, the output of charge pump circuit 600 at output load $R_L$ is boosted to 6.5 volts, which is larger than the supply voltage $V_{SPA}$ at node 630 of 5.0 volts.

In an example for buck operation, with a reference voltage of 4.5 volts for $V_{REF}$ as discussed above for boost operation, as a result of the operation of DC amplifier 606, the voltage at second input terminal 605 will also be 4.5 volts. However, by shorting out transistors $M_5$ and $M_6$, a voltage of 4.5 volts is provided at node 636. As a result, the output of charge pump circuit 600 at output load $R_L$ is bucked to 4.5 volts, which is lower than the supply voltage $V_{SPA}$ at node 630 of 5.0 volts. Again, it should be noted that instead of using a level shifting configuration 620 comprising transistors $M_5$ and $M_6$, a voltage divider configuration can also be used to replace level shifting circuit 620.

As discussed above, prior art charge pump circuits, such as those incorporating a low dropout regulator, can require increases in supply current as the load current increases in order to reject the larger voltage rippled from the charge pump doubler circuit, thus resulting in poor efficiency. Moreover, the low dropout regulator implementation requires a voltage higher than the output voltage to be regulated down to provide a lower output voltage. However, in accordance with another aspect of the present invention, an exemplary charge pump circuit 400, including charge pump circuits 500 and 600, can be configured to facilitate the use of lower voltage processes since the output is the highest voltage in the current. For example, with reference again to FIG. 6 and the exemplary boost operation, the output voltage of circuit 600 can comprise 6.5 volts, while the power supply voltage $V_{SPA}$ is at 5 volts. While the higher voltage of 6.5 volts may also be seen at switches S7 and S8, these switches can be operated such that they will not see the full 6.5V output, and may be less susceptible to degradation problems since they are operated as switches. Accordingly, circuit 600 can permit lower voltage processes to be used to produce a given boosted output voltage for output load $R_L$.

The present invention has been described above with reference to various exemplary embodiments. However, those skilled in the art will recognize that changes and modifications may be made to the exemplary embodiments without departing from the scope of the present invention. For example, the various components may be implemented in alternate ways, such as, for example, by switching from MOSFET-based transistors to JFET-based transistors. These alternatives can be suitably selected depending upon the particular application or in consideration of any number of factors associated with the operation of the system. Moreover, the exemplary servo amplifier circuit can be configured within various integrated circuit applications for continuously controlling the output current to minimize output voltage ripple. These and other changes or modifications are intended to be included within the scope of the present invention, as expressed in the following claims.

What is claimed is:

1. A charge pump circuit configured for providing a low voltage ripple, said charge pump circuit comprising:
   a servo amplifier comprising a DC amplifier having at least one gain stage and a first output transistor;
   a first charge pump capacitor and a second charge pump capacitor configured in a feedback arrangement with said servo amplifier;
   a plurality of switch devices for alternately coupling said first charge pump capacitor and said second charge pump capacitor to said servo amplifier; and
   wherein said servo amplifier, said first charge pump capacitor and said second charge pump capacitor are configured to provide for continuous control of an output current delivered to an output load to minimize output voltage ripple.

2. The charge pump circuit of claim 1, wherein said first charge pump capacitor is coupled to said output transistor during a first phase, said second charge pump capacitor is coupled to said output transistor during a second phase, and both of said first charge pump capacitor and said second charge pump capacitor are coupled to said output transistor during switching between said first phase and said second phase.

3. The charge pump circuit of claim 1, wherein said servo amplifier further comprises a feed-forward circuit configured in parallel with said DC amplifier to provide stability to said servo amplifier.

4. The charge pump circuit of claim 3, wherein said feed-forward circuit comprises a wide bandwidth amplifier and a second output transistor configured to provide current from said second output transistor to facilitate stability of said servo amplifier.

5. The charge pump circuit of claim 4, wherein said feed-forward circuit comprises a wideband amplifier.

6. The charge pump circuit of claim 3, wherein said charge pump circuit further comprises a pair of cascode devices configured to enable said first charge pump capacitor and said second charge pump capacitor to be simultaneously coupled to said output transistor and said second output transistor and to said output load.

7. The charge pump circuit of claim 6, wherein said pair of cascode devices comprise a pair of transistors with drains having high output resistances to prevent shorting together of said first charge pump capacitor and said second charge pump capacitor when simultaneously coupled to said output transistor and to said output load, and being further configured such that said output current can be divided such that a fraction of said output current flows in each of said pair of cascode devices during switching.

8. The charge pump circuit of claim 6, wherein said first charge pump capacitor, said second charge pump capacitor, and said pair of cascode devices are configured in a feedback configuration to provide level-shifting capabilities such that an output of said charge pump circuit can be higher or lower in voltage than an internally generated voltage reference within said charge pump circuit.

9. The charge pump circuit of claim 1, wherein said charge pump circuit is configured as at least one of a negative charge pump circuit and a positive charge pump circuit.

10. The charge pump circuit of claim 6, wherein said pair of cascode devices are configured to minimize ripple on said output transistor and said second output transistor.

11. The charge pump circuit of claim 1, wherein at least four of said plurality of switch devices are configured with level shift blocks to minimize effects of output voltage ripple due to loading when said at least four switch devices are coupled to an output capacitor.

12. The charge pump circuit of claim 1, wherein said charge pump circuit is configured for buck and boost operation.

13. A charge pump circuit having low output voltage ripple, said charge pump circuit comprising:
 a servo amplifier comprising a DC amplifier having a gain stage and a first output transistor, said servo amplifier configured for providing an output current;
 a first charge pump capacitor and a second charge pump capacitor configured to provide a continuous path with said servo amplifier to a load device, said first charge pump capacitor and said second charge pump capacitor being configured for alternate coupling to said first output transistor;
 a pair of switches for coupling said first charge pump capacitor and said second charge pump capacitor to said first output transistor;
 a pair of switches configured for coupling said first charge pump capacitor and said second charge pump capacitor to a load device; and
 wherein said servo amplifier, said first charge pump capacitor and said second charge pump capacitor are configured to provide for continuous control of said output current delivered to a load device to minimize output voltage ripple.

14. The charge pump circuit of claim 13, wherein said first charge pump capacitor is coupled to said output transistor during a first phase, said second charge pump capacitor is coupled to said output transistor during a second phase, and both of said first charge pump capacitor and said second charge pump capacitor are coupled to said output transistor during switching between said first phase and said second phase.

15. The charge pump circuit of claim 13, wherein said servo amplifier further comprises a feed-forward circuit configured in parallel with said DC amplifier to provide stability to said servo amplifier, said feed-forward circuit comprising a wideband amplifier and a second output transistor configured to facilitate stability of said servo amplifier.

16. The charge pump circuit of claim 13, wherein said charge pump circuit further comprises a pair of cascode devices configured to enable said first charge pump capacitor and said second charge pump capacitor to be simultaneously coupled to said output transistor and to said output load.

17. The charge pump circuit of claim 16, wherein said pair of cascode devices comprise a pair of transistors with drains having high output resistances to prevent shorting together of said first charge pump capacitor and said second charge pump capacitor when simultaneously coupled to said output transistor and to said output load, and being further configured such that said output current can be divided such that a fraction of said output current flows in each of said pair of cascode devices during switching.

18. The charge pump circuit of claim 16, wherein said first charge pump capacitor and said second charge pump capacitor are configured in a feedback configuration to provide level-shifting capabilities such that an output of said charge pump circuit can be higher or lower in voltage than an internally generated voltage reference within said charge pump circuit.

19. The charge pump circuit of claim 13, wherein said charge pump circuit is configured as a negative charge pump circuit.

20. The charge pump circuit of claim 13, wherein said charge pump circuit is configured as a positive charge pump circuit.

21. The charge pump circuit of claim 13, wherein said charge pump circuit is configured for buck and boost operation.

22. A charge pump circuit having low output voltage ripple, said charge pump circuit comprising:
 a servo amplifier comprising a DC amplifier having a gain stage and a first output transistor, said servo amplifier configured for providing at least a portion of a single output current;
 at least one pump capacitor configured to provide a continuous path with said servo amplifier to a load device, wherein said servo amplifier and said at least one pump capacitor are configured to provide for continuous control of said single output current delivered to a load device at all times to minimize output voltage ripple.

23. The charge pump circuit according to claim 22, wherein said at least one pump capacitor comprises a first charge pump capacitor and a second charge pump capacitor, and said charge pump circuit further comprises a first pair of switches for coupling said first charge pump capacitor and said second charge pump capacitor to said first output transistor, and a second pair of switches configured for coupling said first charge pump capacitor and said second charge pump capacitor to a load device.

24. A charge pump circuit having low output voltage ripple, said charge pump circuit comprising:
 a servo amplifier comprising a DC amplifier having a gain stage and a first output transistor, said servo amplifier configured for providing an output current;
 at least one capacitance level-shifting device configured to facilitate a continuous path with said servo amplifier to a load device, wherein said servo amplifier and said at least one pump capacitor are configured to provide for continuous control of said output current delivered to a load device to minimize output voltage ripple.

25. The charge pump circuit according to claim 24, wherein said at least one capacitance level shifting device comprises a first charge pump capacitor and a second charge pump capacitor, and said charge pump circuit further comprises a first pair of switches for coupling said first charge pump capacitor and said second charge pump capacitor to said first output transistor, and a second pair of switches configured for coupling said first charge pump capacitor and said second charge pump capacitor to a load device.

26. A charge pump circuit configured for providing a low voltage ripple, said charge pump circuit comprising:
   a servo amplifier comprising a feed-forward circuit having a wideband amplifier and an output transistor;
   a first charge pump capacitor and a second charge pump capacitor configured in a feedback arrangement with said servo amplifier;
   a plurality of switch devices for alternately coupling said first charge pump capacitor and said second charge pump capacitor to said servo amplifier; and wherein said servo amplifier, said first charge pump capacitor and said second charge pump capacitor are configured to provide for continuous control of an output current delivered to an output load to minimize output voltage ripple.

27. A method for providing a charge pump output voltage having a low voltage ripple, said method comprising the steps of:
   charging a first charge pump capacitor to an input voltage;
   coupling said first charge pump capacitor with switching to a servo amplifier in a feedback arrangement during a first phase to discharge said first charge pump capacitor and provide an output current to a load device while charging a second charge pump capacitor to said input voltage; and
   coupling said second charge pump capacitor with switching to said servo amplifier in a feedback arrangement during a second phase to discharge said second charge pump capacitor and provide an output current to said load device while recharging said first charge pump capacitor to said input voltage, and;
   simultaneously coupling said first charge pump capacitor and said second charge pump capacitor to said servo amplifier in a feedback arrangement during transitioning between said first phase and said second phase to provide for continuous control of an output current delivered to an output load to minimize output voltage ripple.

28. The method according to claim 27, further comprising the steps of providing a feed-forward path in parallel to a DC path within said servo amplifier to provide stability.

29. The method according to claim 27, wherein said step of simultaneously coupling comprises coupling said first charge pump capacitor and said second charge pump capacitor to said servo amplifier in a feedback arrangement through a pair of cascode devices to prevent shorting of said first charge pump capacitor and said second charge pump capacitor during simultaneous connection.

30. A charge pump circuit configured for providing a low voltage ripple, said charge pump circuit comprising:
   a first charge pump capacitor configured for control of an output current during a first phase;
   a second charge pump capacitor configured for control of said output current during a second phase;
   a plurality of switch devices for alternately coupling said first charge pump capacitor and said second charge pump capacitor to a load device; and
   wherein said first charge pump capacitor, said second charge pump capacitor, and said plurality of switches are configured to provide for continuous control of said output current delivered to an output load to minimize output voltage ripple.

31. The charge pump circuit of claim 30, wherein said first charge pump capacitor is coupled to said output transistor during a first phase, said second charge pump capacitor is coupled to said output transistor during a second phase, and both of said first charge pump capacitor and said second charge pump capacitor are coupled to said output transistor during switching between said first phase and said second phase.

32. The charge pump circuit of claim 31, wherein both of said first charge pump capacitor and said second charge pump capacitor are coupled to said output transistor during switching between said first phase and said second phase through use of an overlapping clock.

* * * * *